US012603107B2

(12) United States Patent
Nojima et al.

(10) Patent No.: US 12,603,107 B2
(45) Date of Patent: Apr. 14, 2026

(54) SUSPENSION ASSEMBLY AND DISK DEVICE HAVING WIRING MEMBER

(71) Applicants:KABUSHIKI KAISHA TOSHIBA, Tokyo (JP); TOSHIBA ELECTRONIC DEVICES & STORAGE CORPORATION, Tokyo (JP)

(72) Inventors: Yusuke Nojima, Kanagawa (JP); Kenichiro Aoki, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/818,049

(22) Filed: Aug. 28, 2024

(65) Prior Publication Data

US 2025/0316287 A1     Oct. 9, 2025

(30) Foreign Application Priority Data

Apr. 9, 2024   (JP) ................................. 2024-062954

(51) Int. Cl.
G11B 5/48          (2006.01)
(52) U.S. Cl.
CPC .............. G11B 5/486 (2013.01); G11B 5/484 (2013.01); G11B 5/4853 (2013.01)
(58) Field of Classification Search
None
See application file for complete search history.

(56) References Cited

U.S. PATENT DOCUMENTS

| | | | | |
|---|---|---|---|---|
| 7,724,478 B2 | 5/2010 | Deguchi et al. | | |
| 8,173,909 B2 | 5/2012 | Cayaban et al. | | |
| 8,320,084 B1 * | 11/2012 | Shum | ................... | G11B 5/4833 |
| | | | | 360/245.9 |
| 8,446,696 B2 | 5/2013 | Feng et al. | | |
| 8,934,201 B1 | 1/2015 | Feng et al. | | |
| 9,236,070 B1 * | 1/2016 | Cayaban | .............. | G11B 5/4826 |
| 10,373,635 B2 * | 8/2019 | Kikuchi | ................. | H05K 1/118 |
| 11,798,586 B2 * | 10/2023 | Aoki | ...................... | G11B 5/486 |
| 2010/0296195 A1 * | 11/2010 | Kikuchi | ................. | H05K 3/363 |
| | | | | 360/245 |
| 2014/0144680 A1 * | 5/2014 | Okuno | ..................... | H05K 1/05 |
| | | | | 29/846 |
| 2025/0078866 A1 * | 3/2025 | Yamanaka | ........... | G11B 5/4846 |

* cited by examiner

*Primary Examiner* — William J Klimowicz
(74) *Attorney, Agent, or Firm* — Knobbe, Martens, Olson & Bear, LLP

(57)          ABSTRACT

According to one embodiment, a suspension assembly includes a wiring member. The tail connector of the wiring member includes a base layer, a cover layer, and a conductive layer interposed between the base layer and the cover layer. The cover layer includes a groove. The conductive layer includes a first wire, a second wire, and a connection terminal extending between the first wire and the second wire across the groove. The base layer includes a first base covering the first wire, a second base covering the second wire first protrusion pair protruding from the first base to partially cover the connection terminal, and second protrusion pair protruding from the second base to partially cover the connection terminal.

14 Claims, 9 Drawing Sheets

SUSPENSION ASSEMBLY AND DISK DEVICE HAVING WIRING MEMBER

CROSS-REFERENCE TO RELATED APPLICATIONS

This application is based upon and claims the benefit of priority from Japanese Patent Application No. 2024-062954, filed on Apr. 9, 2024; the entire contents of which are incorporated herein by reference.

FIELD

Embodiments described herein relate generally to a suspension assembly and a disk device.

BACKGROUND

Disk devices such as a hard disk drive (HDD) typically include, for example, a controller, a suspension assembly, a flexible printed circuit board (FPC), and magnetic disks. The controller controls magnetic heads of the suspension assembly through the FPC to read and write information from and to the magnetic disks.

The suspension assembly includes a wiring member that connects the FPC and the magnetic heads. The wiring member includes two insulating layers and a conductive layer interposed between the two insulating layers. Connection terminals of the conductive layer are bonded to FPC pads using solder.

The connection terminal may be, for example, a flying lead. In such a case the conductive layer is decreased in thickness so that the connection terminal is decreased in thickness accordingly. The insulating layers can cover the connection terminal for reinforcement, however, the insulating layers may hinder the solder from adhering to the connection terminal.

BRIEF DESCRIPTION OF THE DRAWINGS

FIG. 4 is an exemplary plan view illustrating a tail connector of the first embodiment;

DETAILED DESCRIPTION

In general, according to one embodiment, a suspension assembly includes a support plate, a wiring member, and a magnetic head. The wiring member includes a mount disposed on the support plate, and a tail connector spaced from the support plate. The magnetic head is mounted on the mount. The tail connector includes a base layer, a cover layer, a conductive layer, and a backing layer. The base layer has insulating properties. The cover layer has insulating properties. The conductive layer is interposed between the base layer and the cover layer. The backing layer is attached to the base layer. The cover layer includes a first cover and a second cover spaced from the first cover, and a groove extending between the first cover and the second cover. The conductive layer includes at least one first wire, at least one second wire, and at least one connection terminal. The first wire is disposed on the first cover and electrically connected to the magnetic head. The second wire is disposed on the second cover. The connection terminal extends between the first wire and the second wire across the groove. The base layer includes a first base, a second base, at least one first protrusion pair, and at least one second protrusion pair. The first base covers the first wire. The second base covers the second wire. The first protrusion pair are spaced from the second base and protrude from the first base, to partially cover the connection terminal. The second protrusion pair are spaced from the first base and the first protrusion pair and protrude from the second base, to partially cover the connection terminal.

First Embodiment

Hereinafter, a first embodiment will be described with reference to FIGS. 1 to 8. In the present specification, components according to embodiments and descriptions of the components may be described in a plurality of expressions. The components and the description thereof are examples, and are not limited by the expression of the present specification. Components may also be identified with names different from those herein. In addition, the components may be described by expressions different from the expressions in the present specification.

In the following description, "prevent" is defined as, for example, preventing the occurrence of an event, an action, or an influence, or reducing the degree of the event, the action, or the influence. Furthermore, in the following description, "restrict" is defined as, for example, preventing movement or rotation, or allowing movement or rotation within a predetermined range and blocking movement or rotation beyond the predetermined range.

Figure 1:
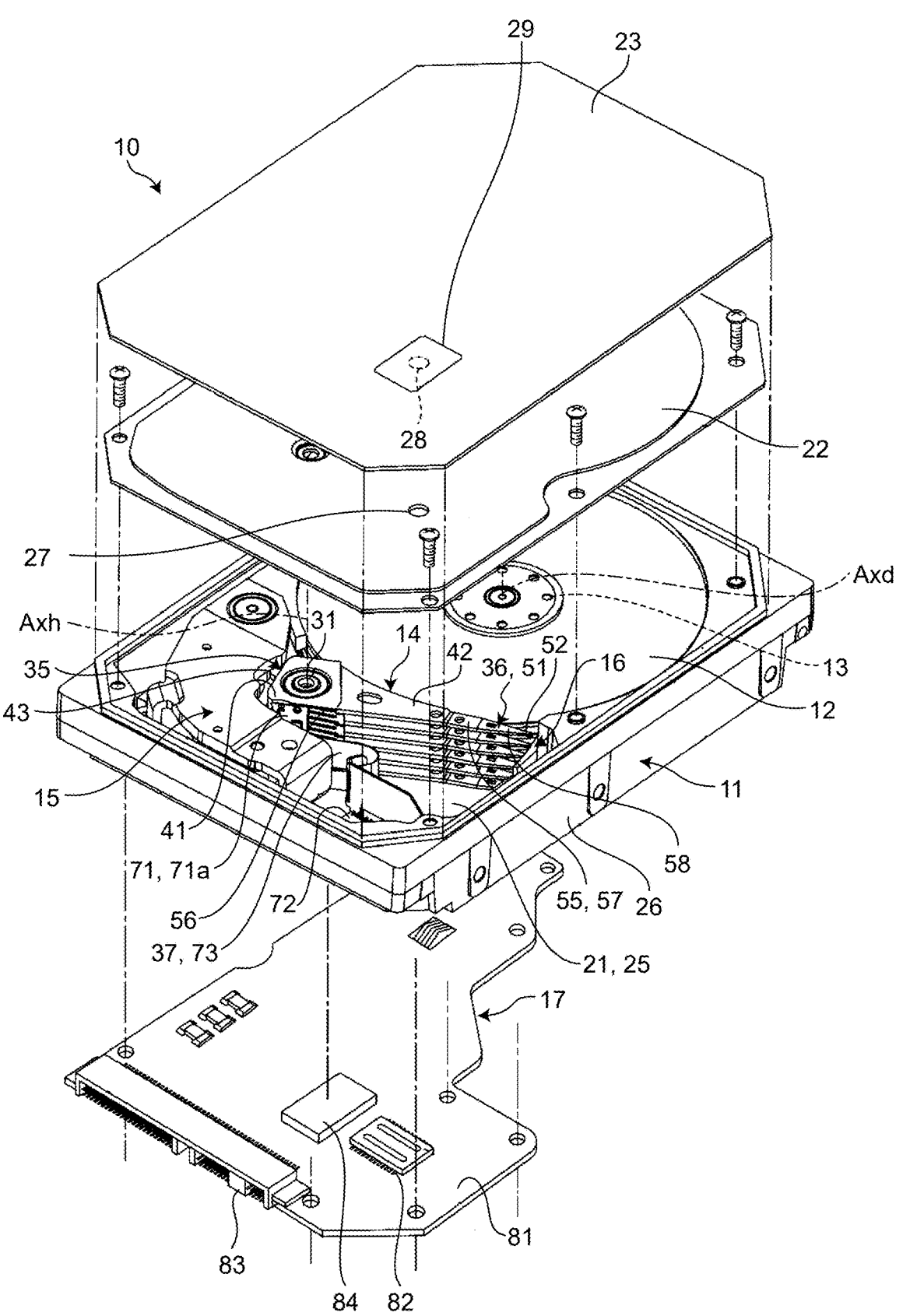
FIG. 1 is an exemplary perspective view illustrating an HDD according to a first embodiment in an exploded manner.

FIG. 1 is an exemplary perspective view illustrating a hard disk drive (HDD) 10 according to a first embodiment in an exploded manner. The HDD 10 is an example of a disk device, and may also be referred to as an electronic device, a storage device, an external storage device, or a magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The HDD 10 is not limited to the present example.

The housing 11 accommodates the magnetic disk 12, the spindle motor 13, the HSA 14, the VCM 15, and the ramp load mechanism 16. The housing 11 includes a base 21, an inner cover 22, and an outer cover 23.

The base 21 has a substantially rectangular parallelepiped box shape opened in one direction. The base 21 includes a bottom wall 25 and a side wall 26. The bottom wall 25 has a substantially rectangular (quadrangular) plate shape. The side wall 26 protrudes from the edge of the bottom wall 25 and has a substantially rectangular frame shape.

The inner cover 22 is attached to the end of the side wall 26 with, for example, a screw, and closes the space inside the base 21. The outer cover 23 covers the inner cover 22 and is attached to the end of the side wall 26 by welding, for example. A vent 27 is provided in the inner cover 22. Furthermore, a vent 28 is provided in the outer cover 23.

After the components are attached to the inside of the base 21 and the inner cover 22 and the outer cover 23 are attached to the base 21, the air inside the housing 11 is removed from the vents 27 and 28. Furthermore, the housing 11 is filled with a gas different from air.

The gas filled in the housing 11 is, for example, a low density gas having a density lower than that of air, an inert gas having low reactivity, or the like. For example, helium is filled inside the housing 11. The inside of the housing 11 may be filled with another fluid.

The vent 28 of the outer cover 23 is closed by a seal 29. The seal 29 air-tightly seals the vent 28 and restricts the fluid filled inside the housing 11 from leaking out of the vent 28.

A plurality of magnetic disks 12 are formed in a substantially disk shape. A magnetic recording layer is provided on at least one of the upper surface and the lower surface of the magnetic disk 12. The plurality of magnetic disks 12 are stacked at intervals.

The spindle motor 13 supports the plurality of magnetic disks 12. The spindle motor 13 rotates the plurality of magnetic disks 12 around an axis Axd of the spindle motor 13. The plurality of magnetic disks 12 are held by a hub of the spindle motor 13 by, for example, a clamp spring.

The HSA 14 is rotatably supported by a support shaft 31. The support shaft 31 is provided at a position separated from the magnetic disk 12 in a direction orthogonal to the axis Axd. The support shaft 31 protrudes from the bottom wall 25 of the housing 11.

The HSA 14 can rotate about an axis Axh. The axis Axh is a virtual axis extending substantially parallel to the axis Axd of the magnetic disk 12. The axis Axh is, for example, the center of rotation of the HSA 14 and also the axis of the support shaft 31.

The HSA 14 includes a carriage 35, a plurality of head gimbal assemblies (HGAs) 36, and a flexible printed circuit board (FPC) 37. The HGA 36 is an example of a suspension assembly and may also be referred to as a head suspension. The FPC 37 is an example of a substrate.

The carriage 35 is made of metal, for example. The carriage 35 includes an actuator block 41, a plurality of arms 42, and a frame 43.

The actuator block 41 is rotatably supported by the support shaft 31 via a bearing, for example. The plurality of arms 42 protrude from the actuator block 41 in a direction substantially orthogonal to the axis Axh. The carriage 35 may be divided, and the arm 42 may protrude from each of the plurality of actuator blocks 41.

The plurality of arms 42 extend substantially in parallel and are arranged at intervals along the axis Axh. Each of the arms 42 has a plate shape capable of entering a gap between adjacent two of the plurality of magnetic disks 12.

The frame 43 opposes the arm 42, protruding from the actuator block 41. A voice coil of the VCM 15 is attached to the frame 43. The VCM 15 includes the voice coil, a pair of yokes, and a magnet provided on the yoke.

Figure 2:
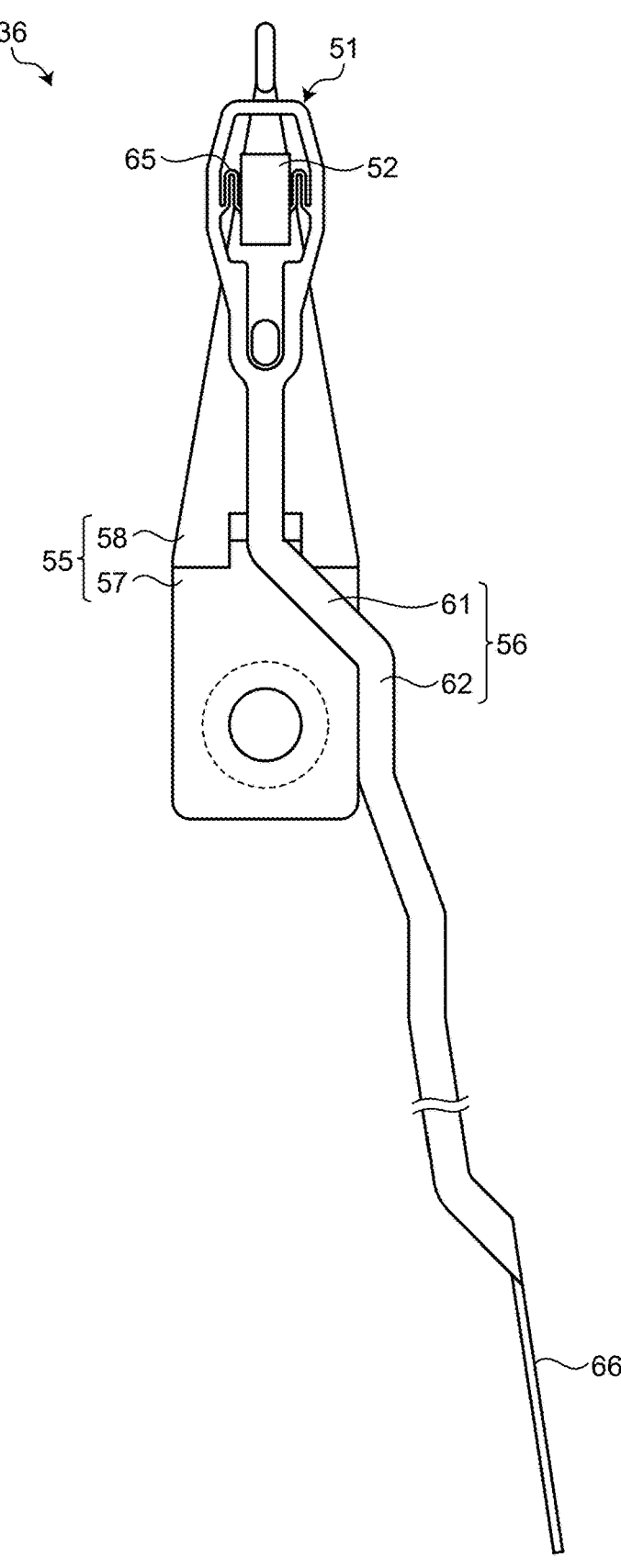
FIG. 2 is an exemplary plan view illustrating an HGA of the first embodiment.

FIG. 2 is an exemplary plan view illustrating the HGA 36 of the first embodiment. The plurality of HGAs 36 are attached to the tip of a corresponding one of the plurality of arms 42. As a result, the plurality of HGAs 36 are arranged at intervals along the axis Axh. As illustrated in FIG. 2, each of the plurality of HGAs 36 includes a suspension 51 and a magnetic head 52. The magnetic head 52 may also be referred to as a slider.

The suspension 51 supports the magnetic head 52. The suspension 51 includes a support plate 55 and a flexure 56. The flexure 56 is an example of a wiring member. The support plate 55 includes a base plate 57 and a load beam 58. The support plate 55 is not limited to the present example, and may be one member, for example.

The base plate 57 is attached to the tip of the arm 42. The load beam 58 has a plate shape thinner than the base plate 57. The load beam 58 is attached to the base plate 57 to protrude from the base plate 57.

The flexure 56 is a type of flexible printed wiring board of an elongated belt shape. The flexure 56 includes, for example, a front part 61 and a rear part 62. The front part 61 and the rear part 62 are terms for convenience, and do not limit the position, direction, and usage mode.

The front part 61 is disposed on the support plate 55. For example, the front part 61 is attached to the support plate 55 by spot welding at a plurality of positions. The front part 61 includes a gimbal 65. The gimbal 65 is an example of the mount.

The gimbal 65 is provided at one end of the flexure 56. The magnetic head 52 is mounted on the gimbal 65. The gimbal 65 is attached to the load beam 58 such that the magnetic head 52 is rotatable.

The rear part 62 extends along the arm 42 from the front part 61 toward the actuator block 41. The rear part 62 is spaced apart from the support plate 55. The rear part 62 includes a tail connector 66. The tail connector 66 is located at the other end of the flexure 56.

Figure 3:
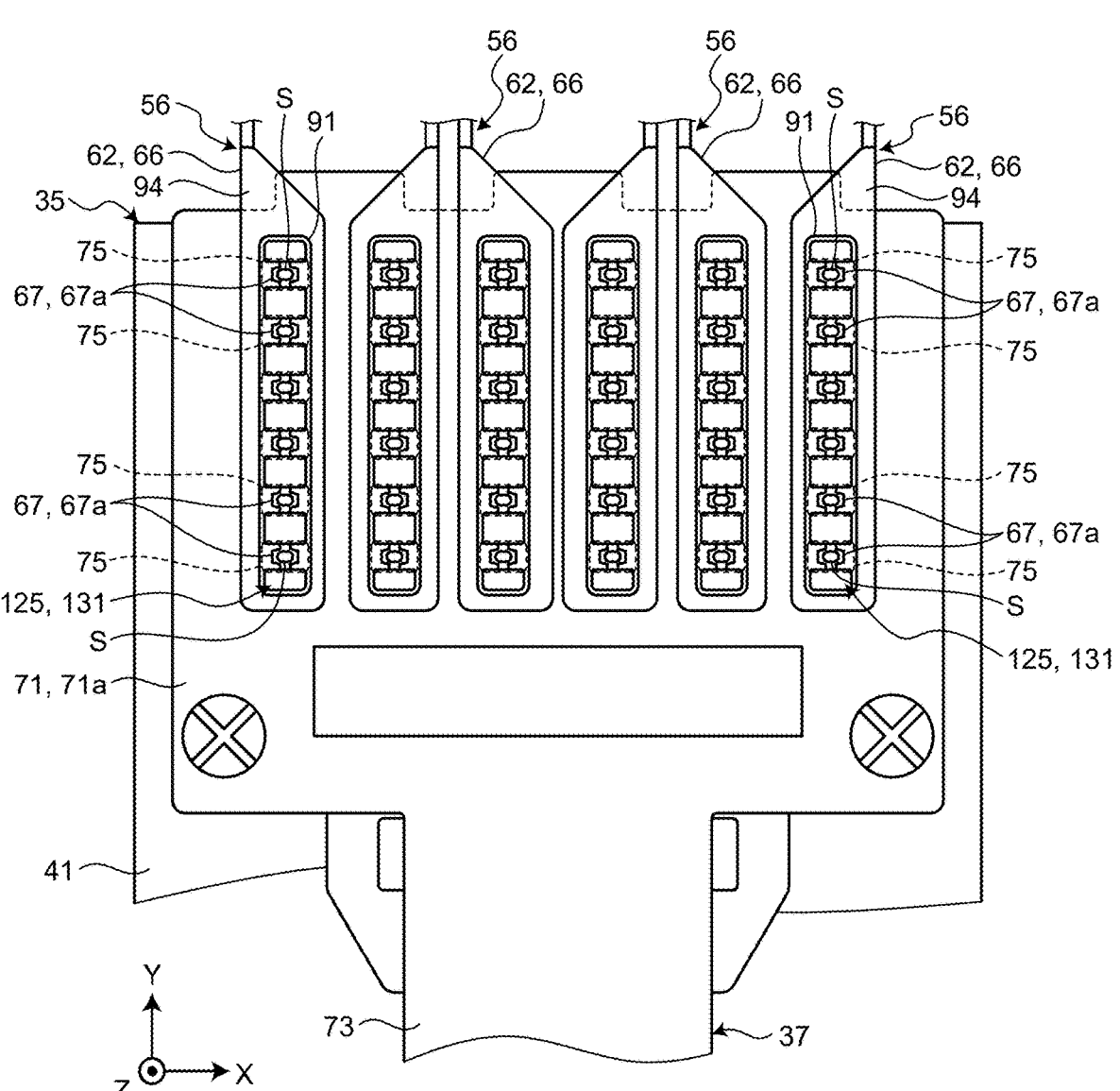
FIG. 3 is an exemplary plan view schematically illustrating a part of a carriage, an FPC, and a flexure of the first embodiment.

FIG. 3 is an exemplary plan view schematically illustrating a part of the carriage 35, the FPC 37, and the flexure 56 of the first embodiment. As illustrated in FIG. 3, the tail connector 66 has a band shape and includes a plurality of connection terminals 67. The connection terminal 67 may also be referred to as an electrode.

As illustrated in FIG. 1, the FPC 37 has, for example, a band shape. The FPC 37 includes two joints 71 and 72 and a flexible portion 73. The joint 71 is provided at one end portion of the FPC 37 and is attached to the actuator block 41. The joint 72 is provided at the other end portion of the FPC 37 and is attached to the bottom wall 25 of the base 21. The flexible portion 73 is provided between the joint 71 and the joint 72 and elastically bends according to the rotation of the HSA 14.

As illustrated in FIG. 3, the joint 71 has a surface 71a. The surface 71a is a substantially rectangular, flat surface, and faces a direction substantially orthogonal to the axis Axh as a whole. The surface 71a is not limited to this example, and may have irregularities or may be partially bent.

Hereinafter, for convenience, an X axis, a Y axis, and a Z axis are defined. The X axis, the Y axis, and the Z axis are orthogonal to each other. The X axis is provided along the width of the surface 71a. The Y axis is provided along the length of the surface 71a. The Z axis is provided orthogonal to the surface 71a.

Furthermore, in the present specification, an X direction, a Y direction, and a Z direction are defined. The X direction is a direction along the X axis and includes a +X direction indicated by an arrow of the X axis and a −X direction that is an opposite direction of the arrow of the X axis. The Y direction is a direction along the Y axis and includes a +Y direction indicated by an arrow of the Y axis and a −Y direction that is an opposite direction of the arrow of the Y axis. The Z direction is a direction along the Z axis and includes a +Z direction indicated by an arrow of the Z axis and a −Z direction that is an opposite direction of the arrow of the Z axis. The surface 71a faces the +Z direction.

The joint 71 is provided with a plurality of pads 75. The pad 75 may also be referred to as an electrode or a land. The plurality of pads 75 form a plurality of rows arranged in the substantially X direction. In each of the plurality of rows, the plurality of pads 75 are arranged in the substantially Y direction. The number of rows of pads 75 is equal to the number of HGAs 36. The tail connector 66 of the HGA 36 extends in the substantially Y direction along the rows of pads 75 and covers the rows of pads 75.

The HGA 36 further includes a plurality of pieces of solder S. The plurality of pieces of solder S bond the plurality of connection terminals 67 of the flexure 56 and the plurality of pads 75 of the FPC 37. As a result, the flexure 56 electrically connects the FPC 37 and the magnetic head 52.

The VCM 15 in FIG. 1 rotates the carriage 35 about the axis A×h. The carriage 35 rotates about the axis A×h to move the magnetic head 52 to a desired position on the magnetic disk 12.

The magnetic head 52 includes a read element that reproduces information from the recording layer of the magnetic disk 12 and a write element that records information on the recording layer. The magnetic head 52 reads and writes information from and to the magnetic disk 12. The magnetic head 52 may include another device such as a laser diode that heats the magnetic disk 12.

When the magnetic head 52 moves to the outermost periphery of the magnetic disk 12 by the rotation of the carriage 35 by the VCM 15, the ramp load mechanism 16 holds the HGA 36. When the HGA 36 is held by the ramp load mechanism 16, the magnetic head 52 is spaced apart from the magnetic disk 12.

The PCB 17 is disposed outside the housing 11 and is attached to the bottom wall 25 of the base 21. The PCB 17 includes, for example, a printed wiring board (PWB) 81, a relay connector 82, an interface (I/F) connector 83, and a controller 84.

The PWB 81 is, for example, a rigid board such as a glass epoxy board, and is a multilayer board or a build-up board. The relay connector 82, the I/F connector 83, and the controller 84 are mounted on the PWB 81.

The relay connector 82 is electrically connected to the joint 72 of the FPC 37 through, for example, a connector provided on the bottom wall 25 of the housing 11. The I/F connector 83 is connected to a host computer. The controller 84 is, for example, an electronic component such as a system on a chip, and controls the operation of the HDD 10.

The controller 84 is electrically connected to the magnetic head 52 through the PWB 81, the relay connector 82, the FPC 37, and the flexure 56. The controller 84 reads and writes information from and to the magnetic disk 12 by the magnetic head 52.

Figure 4:
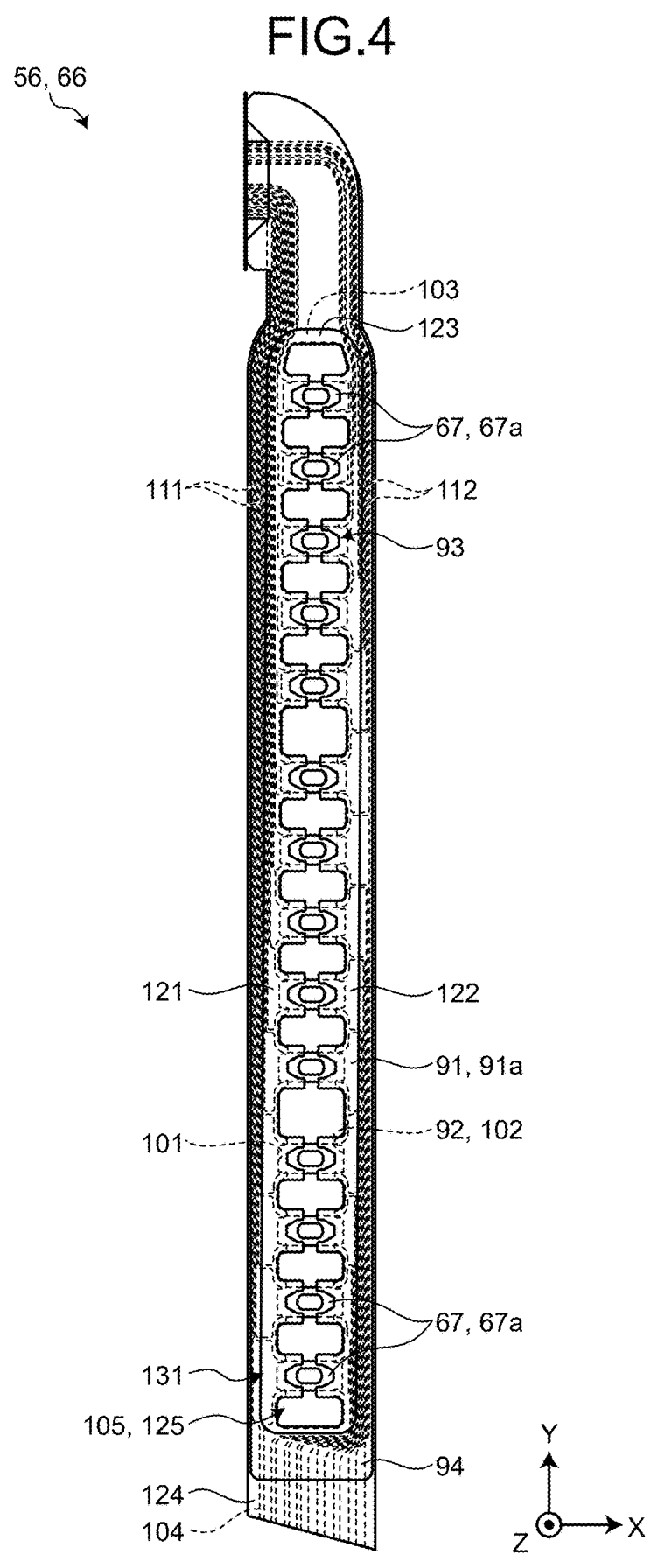
Figure 5:
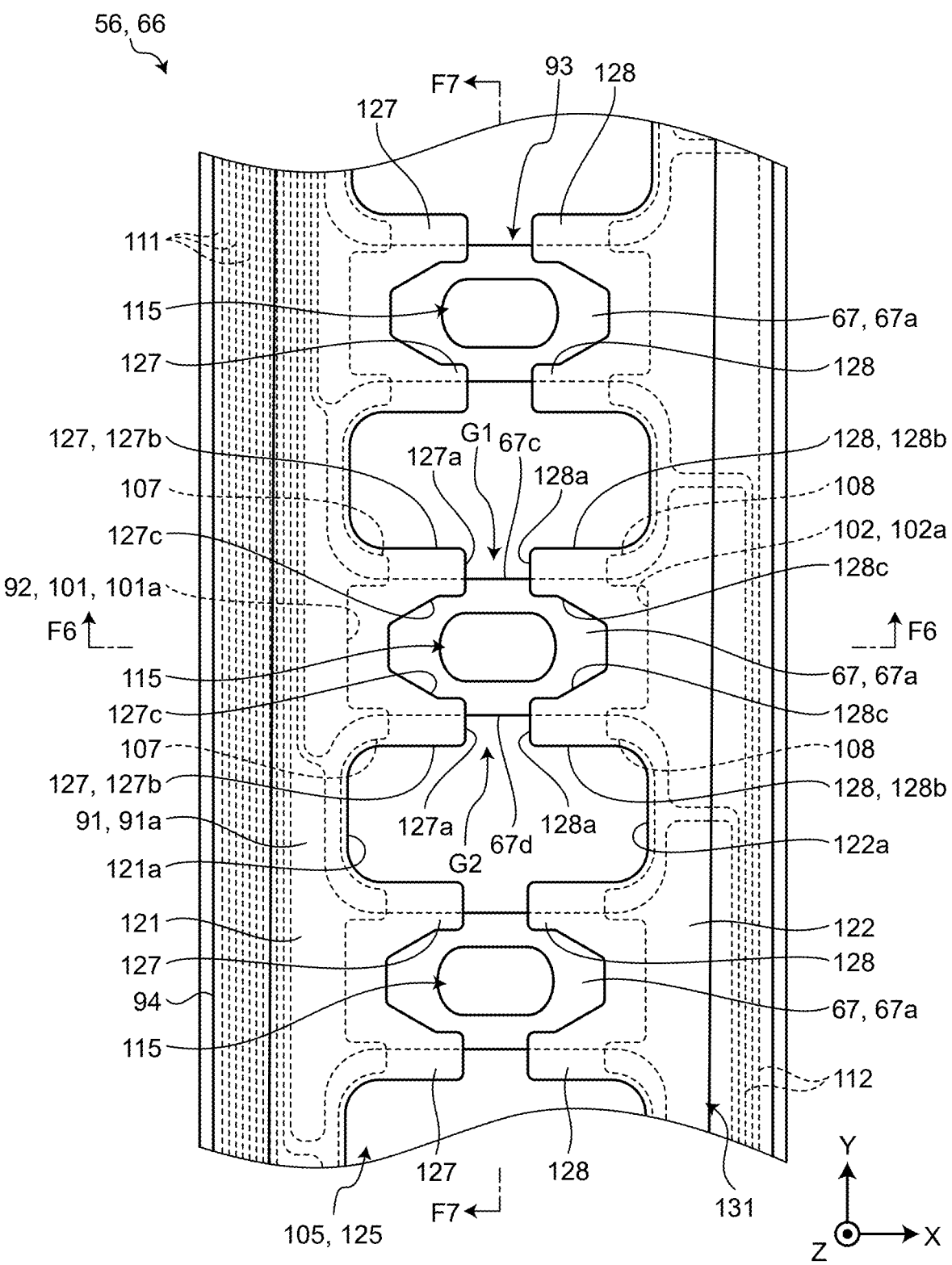
FIG. 5 is an exemplary plan view illustrating a part of the tail connector of the first embodiment.
Figure 6:
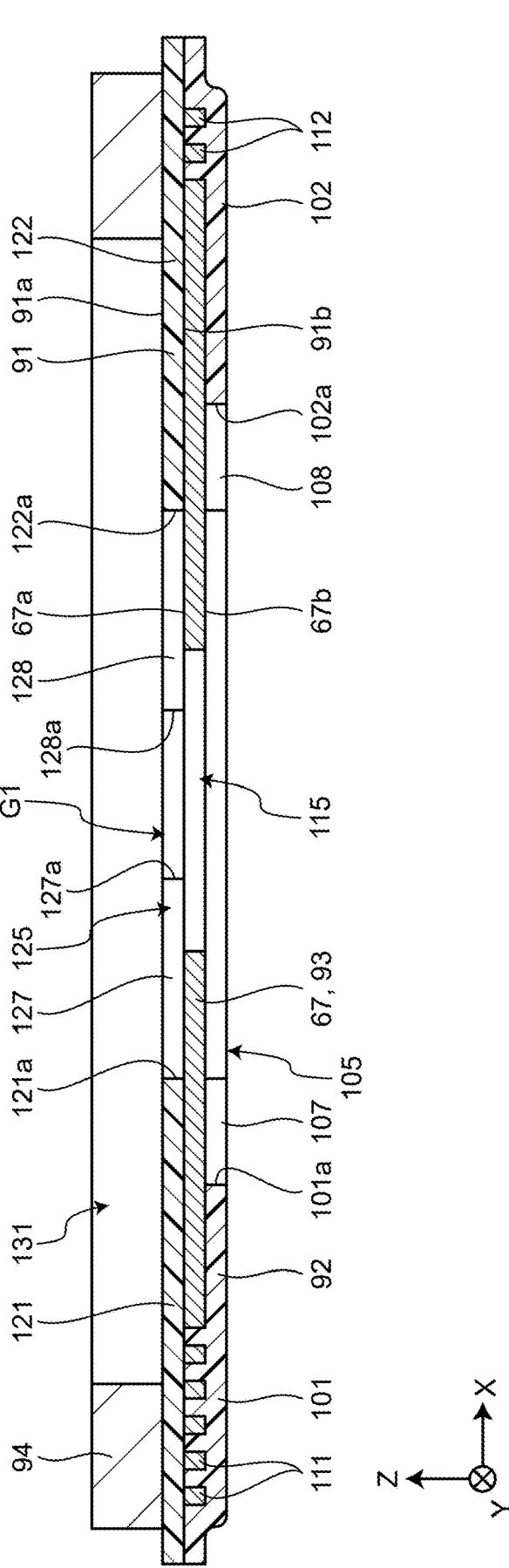
FIG. 6 is an exemplary cross-sectional view illustrating the tail connector of the first embodiment along F6-F6 line of FIG. 5.

FIG. 4 is an exemplary plan view illustrating the tail connector 66 of the first embodiment. FIG. 5 is an exemplary plan view illustrating a part of the tail connector 66 of the first embodiment. FIG. 6 is an exemplary cross-sectional view illustrating the tail connector 66 of the first embodiment along F6-F6 line of FIG. 5.

As illustrated in FIG. 6, the flexure 56 includes a base layer 91, a cover layer 92, a conductive layer 93, and a backing layer 94. Therefore, the tail connector 66 that is a part of the flexure 56 also partially includes the base layer 91, the cover layer 92, the conductive layer 93, and the backing layer 94. The base layer 91 and the cover layer 92 may also be referred to as insulating layers.

Each of the base layer 91 and the cover layer 92 is an insulating thin film, and is made of, for example, polyimide (PI). The base layer 91 and the cover layer 92 may be made of other materials or may be made of materials different from each other.

In the tail connector 66, the base layer 91 has two surfaces 91a and 91b. The surface 91a is substantially flat and faces the substantially +Z direction as a whole. The surface 91b is opposite the surface 91a. The surface 91b is substantially flat and faces the substantially −Z direction as a whole. The surface 91b of the base layer 91 and the surface 71a of the joint 71 face each other. The cover layer 92 covers the surface 91b of the base layer 91.

The conductive layer 93 is made of metal such as copper foil, for example. The conductive layer 93 is provided on the surface 91b of the base layer 91. A part of the conductive layer 93 is covered with the cover layer 92. That is, the conductive layer 93 is interposed between the base layer 91 and the cover layer 92.

The backing layer 94 is, for example, a metal plate of stainless steel. The backing layer 94 is not limited to the present example. The backing layer 94 is attached to the surface 91a of the base layer 91. The rigidity of the backing layer 94 is higher than the rigidity of each of the base layer 91, the cover layer 92, and the conductive layer 93.

As illustrated in FIG. 4, the cover layer 92 in the tail connector 66 has a substantially rectangular frame shape. The cover layer 92 includes two lateral parts 101 and 102 and two end portions 103 and 104. The lateral part 101 is an example of a first cover. The lateral part 102 is an example of a second cover.

Each of the lateral parts 101 and 102 extends in the substantially Y direction. The lateral part 102 is spaced from the lateral part 101 in the +X direction. The +X direction is an example of a first direction. The end portion 103 is connected to an end of the lateral parts 101 and 102 in the +Y direction. The end portion 104 is connected to an end of the lateral parts 101 and 102 in the −Y direction. Therefore, the end portion 104 is spaced from the end portion 103 in the −Y direction.

The cover layer 92 is provided with a cover groove 105. The cover groove 105 is an example of a groove. The cover groove 105 is a hole that penetrates the cover layer 92 in the substantially Z direction. The cover groove 105 is not limited to the present example, and may be a notch, for example.

The cover groove 105 is defined by, for example, the lateral parts 101 and 102 and the end portions 103 and 104. Therefore, the cover groove 105 is located between the two lateral parts 101 and 102 and is located between the two end portions 103 and 104. The cover groove 105 extends in the substantially Y direction.

As illustrated in FIG. 5, the lateral part 101 includes an edge 101a. The edge 101a is provided at an end of the lateral part 101 in the +X direction and extends in the substantially Y direction. The lateral part 102 includes an edge 102a. The edge 102a is provided at an end of the lateral part 102 in the −X direction and extends in the substantially Y direction. The edge 101a and the edge 102a face each other and define the cover groove 105.

The cover layer 92 further includes a plurality of pairs of protrusions 107 and 108. The protrusion 107 is an example of a third protrusion. The protrusion 108 is an example of a fourth protrusion. The plurality of pairs of protrusions 107 protrude in the substantially +X direction from the edge 101a of the lateral part 101 toward the lateral part 102. The protrusion 107 is spaced from the lateral part 102. The plurality of pairs of protrusions 108 protrude in the substantially –X direction from the edge 102a of the lateral part 102 toward the lateral part 101. The protrusion 108 is spaced from the lateral part 101 and the protrusion 107.

In the tail connector 66, the conductive layer 93 includes a plurality of wires 111 and 112 and a plurality of connection terminals 67. The wire 111 is an example of a first wire. The wire 112 is an example of a second wire. The wires 111 and 112 may also be referred to as signal lines.

As illustrated in FIG. 6, the wires 111 are disposed on the surface 91b of the base layer 91 between the base layer 91 and the lateral part 101. In other words, the wires 111 are disposed on the lateral part 101. The plurality of wires 111 extend substantially in parallel on the lateral part 101.

The wires 111 extend between the lateral part 101 and the gimbal 65. At least one of the plurality of wires 111 is electrically connected to the magnetic head 52 through the gimbal 65. At least another one of the plurality of wires 111 may be electrically connected to another component such as a piezoelectric element, may be in a floating state, or may be electrically connected to the backing layer 94.

The wires 112 are disposed on the surface 91b of the base layer 91 between the base layer 91 and the lateral part 102. In other words, the wire 112 are disposed on the lateral part 102. The plurality of wires 112 extend substantially in parallel on the lateral part 102.

Each of the plurality of wires 112 is electrically connected to, for example, the magnetic head 52, the piezoelectric element, or the backing layer 94. At least one of the plurality of wires 112 may be in a floating state.

As illustrated in FIG. 5, the plurality of connection terminals 67 extend in the substantially +X direction from the plurality of wires 111 toward the plurality of wires 112. That is, each of the plurality of connection terminals 67 extends in the substantially X direction between one wiring 111 and one wiring 112 across the cover groove 105, forming a beam shape.

As illustrated in FIG. 6, each of the plurality of connection terminals 67 has two surfaces 67a and 67b. The surface 67a is substantially flat and faces the substantially +Z direction. The surface 67b is opposite the surface 67a and faces the substantially –Z direction.

As illustrated in FIG. 5, each of the plurality of connection terminals 67 further includes a pair of edges 67c and 67d. The edge 67c is at an end of the connection terminal 67 in the +Y direction and extends in the substantially X direction. The edge 67d is at an end of the connection terminal 67 in the –Y direction and extends in the substantially X direction. That is, the pair of edges 67c and 67d are opposite to each other. The edges 67c and 67d may have irregularities or may be bent.

As illustrated in FIG. 6, each of the protrusions 107 and 108 of the cover layer 92 partially covers the surface 67b of the connection terminal 67. As illustrated in FIG. 5, for example, the pair of protrusions 107 cover the pair of edges 67c and 67d of the connection terminal 67. In other words, each of the pair of protrusions 107 extends in the Y direction across the edge 67c or the edge 67d. The pair of protrusions 108 also cover the pair of edges 67c and 67d of the connection terminal 67. The protrusions 107 and 108 may be spaced from the edges 67c and 67d.

Each of the plurality of connection terminals 67 of the conductive layer 93 is provided with a hole 115. The hole 115 penetrates the connection terminal 67 in the substantially Z direction and opens to the two surfaces 67a and 67b.

The hole 115 has, for example, an oval shape extending in the X direction. The shape of the hole 115 is not limited to this example.

The hole 115 is located in the center of the connection terminal 67. Specifically, the hole 115 is in the center of the connection terminal 67 in the X direction and in the Y direction. As long as a part of the hole 115 is located in the center of the connection terminal 67, the center of the hole 115 may be offset from the center of the connection terminal 67. The hole 115 may be apart from the center of the connection terminal 67.

The plurality of connection terminals 67 are arranged at intervals in the Y direction (+Y direction). The +Y direction is a direction orthogonal to the +X direction, and is an example of a second direction. An interval between two adjacent connection terminals 67 is longer than a width of the connection terminal 67. The width of the connection terminal 67 corresponds to a distance between the pair of edges 67c and 67d in the Y direction. The interval between the connection terminals 67 is not limited to the present example.

As illustrated in FIG. 4, in the tail connector 66 the base layer 91 has a substantially rectangular frame shape. The base layer 91 includes two lateral parts 121 and 122 and two end portions 123 and 124. The lateral part 121 is an example of a first base. The lateral part 122 is an example of a second base.

Each of the lateral parts 121 and 122 extends in substantially the Y direction. The lateral part 121 covers the lateral part 101 of the cover layer 92 and the plurality of wires 111. The lateral part 122 covers the lateral part 102 of the cover layer 92 and the plurality of wires 112. The lateral part 122 is thus spaced from the lateral part 121 in the +X direction.

The end portion 123 is connected to an end of the lateral parts 121 and 122 in the +Y direction. The end portion 123 covers the end portion 103 of the cover layer 92 and the plurality of wires 111 and 112 disposed on the end portion 103.

The end portion 124 is connected to an end of the lateral parts 121 and 122 in the –Y direction. Therefore, the end portion 124 is spaced from the end portion 123 in the –Y direction. The end portion 124 covers the end portion 104 of the cover layer 92 and the plurality of wires 111 and 112 disposed on the end portion 104.

The base layer 91 is provided with a base groove 125. The base groove 125 is a hole that penetrates the base layer 91 in the substantially Z direction. The base groove 125 is not limited to the present example, and may be a notch, for example.

The base groove 125 is defined by, for example, the lateral parts 121 and 122 and the end portions 123 and 124. Therefore, the base groove 125 is located between the two lateral parts 121 and 122 and is located between the two end portions 123 and 124. The base groove 125 extends in the substantially Y direction.

The base groove 125 communicates with the cover groove 105. The cover groove 105 and the base groove 125 expose the surfaces 67a and 67b of the plurality of connection terminals 67. That is, the plurality of connection terminals 67 are a part of the conductive layer 93 exposed by the cover groove 105 and the base groove 125, and forms a flying lead. The connection terminal 67 is not limited to the present example.

As illustrated in FIG. 5, the lateral part 121 includes an edge 121a. The edge 121a is provided at an end of the lateral part 121 in the +X direction and extends in the substantially Y direction. The lateral part 122 includes an edge 122a. The edge 122*a* is provided at an end of the lateral part 122 in the −X direction and extends in the substantially Y direction. The edge 121*a* and the edge 122*a* face each other and define the base groove 125.

The base layer 91 further includes a plurality of pairs of protrusions 127 and 128. The protrusion 127 is an example of a first protrusion. The protrusion 128 is an example of a second protrusion. The plurality of pairs of protrusions 127 protrude in the substantially +X direction from the edge 121*a* of the lateral part 121 toward the lateral part 122. The protrusions 127 are spaced from the lateral part 122. The plurality of pairs of protrusions 128 protrude in the substantially −X direction from the edge 122*a* of the lateral part 122 toward the lateral part 121. The protrusions 128 are spaced from the lateral part 121 and the protrusion 127.

The plurality of pairs of protrusions 127 and 128 are spaced from each other in the Y direction. The pair of protrusions 127 are spaced from each other in the +Y direction. The pair of protrusions 128 are also spaced from each other in the +Y direction.

Each of the protrusions 127 and 128 partially covers the surface 67*a* of the connection terminal 67. For example, the pair of protrusions 127 cover the pair of edges 67*c* and 67*d* of the connection terminal 67. In other words, each of the pair of protrusions 127 extends in the Y direction across the edge 67*c* or the edge 67*d*. The pair of protrusions 128 also cover the pair of edges 67*c* and 67*d* of the connection terminal 67. The protrusions 127 and 128 may be spaced from the edges 67*c* and 67*d*.

Each of the plurality of protrusions 127 includes a tip 127*a*. The tip 127*a* is at an end of the protrusion 127 in the +X direction. Each of the plurality of protrusions 128 also includes a tip 128*a*. The tip 128*a* is at an end of the protrusion 128 in the −X direction. Each of the tips 127*a* and 128*a* extends in the substantially Y direction. The tips 127*a* and 128*a* are not limited to the present example. The tip 127*a* and the tip 128*a* face each other.

There is a gap G1 between the tip 127*a* of one of the pair of protrusions 127 and the tip 128*a* of one of the pair of protrusions 128. The gap G1 is an example of a first gap. The gap G1 extends in the substantially Y direction. The protrusions 127 and 128 oppose each other with the gap G1.

There is a gap G2 between the tip 127*a* of the other of the pair of protrusions 127 and the tip 128*a* of the other of the pair of protrusions 128. The gap G2 is an example of a second gap. The gap G2 extends in the substantially Y direction. The protrusions 127 and 128 oppose each other with the gap G2.

In the present embodiment, the gaps G1 and G2 are located in the center of the connection terminal 67 in the X direction (+X direction). In other words, the gap G1 and the gap G2 are aligned with each other in the Y direction (+Y direction). As long as a part of the gaps G1 and G2 is located in the center of the connection terminal 67 in the X direction, the centers of the gaps G1 and G2 may be offset from the center of the connection terminal 67 in the X direction. Further, the gaps G1 and G2 may be apart from the center of the connection terminal 67 in the X direction.

In the Y direction (+Y direction), the hole 115 is located between the pair of protrusions 127 and is located between the pair of protrusions 128. The hole 115 is spaced from the protrusions 127 and 128 and is spaced from the gaps G1 and G2.

Each of the plurality of protrusions 127 at least partially tapers toward the lateral part 122. For example, each of the protrusions 127 includes two edges 127*b* and 127*c*. The edge 127*b* is spaced from the connection terminal 67 and extends in the substantially X direction. The edge 127*c* is opposite the edge 127*b*. The edge 127*c* extends obliquely with respect to the edge 127*b* on the surface 67*a* of the connection terminal 67. The distance between the edge 127*b* and the edge 127*c* decreases toward the lateral part 122.

Each of the plurality of protrusions 128 at least partially tapers toward the lateral part 121. For example, each of the protrusions 128 includes two edges 128*b* and 128*c*. The edge 128*b* is spaced from the connection terminal 67 and extends in the substantially X direction. The edge 128*c* is opposite the edge 128*b*. The edge 128*c* extends obliquely with respect to the edge 128*b* on the surface 67*a* of the connection terminal 67. The distance between the edge 128*b* and the edge 128*c* decreases toward the lateral part 122. The edges 127*c* and 128*c* face the hole 115.

In the X direction (+X direction), the protrusions 127 and 128 each have a length equal to 25% or more of the length of the connection terminal 67. In the X direction (+X direction), the hole 115 is larger in dimension than the gap G1 and the gap G2. The dimension of the protrusions 127 and 128 and the hole 115 is not limited to this example. For example, the hole 115 may be smaller in dimension than at least one of the gaps G1 and G2.

The protrusion 107 of the cover layer 92 covers the protrusion 127 of the base layer 91. In the X direction, the protrusion 107 of the cover layer 92 is shorter in length than the protrusion 127 of the base layer 91. That is, the protrusion 107 of the cover layer 92 protrudes from the lateral part 101 less than the protrusion 127 of the base layer 91.

The protrusion 108 of the cover layer 92 covers the protrusion 128 of the base layer 91. In the X direction, the protrusion 108 of the cover layer 92 is shorter than the protrusion 128 of the base layer 91. That is, the protrusion 108 of the cover layer 92 protrudes from the lateral part 102 less than the protrusion 128 of the base layer 91.

In the X direction, the length of each of the protrusions 107 and 108 is shorter than 25% of the length of the connection terminal 67. Therefore, in the X direction, the gap between the two opposing protrusions 107 and 108 is longer than the hole 115. The lengths of the protrusions 107 and 108 are not limited to the present example.

In the tail connector 66, the backing layer 94 has a substantially rectangular frame shape. A through hole 131 is provided in the backing layer 94. The through hole 131 penetrates the backing layer 94 in the substantially Z direction and communicates with the base groove 125. The through hole 131 is larger than the base groove 125. The through hole 131 exposes the connection terminal 67 and the protrusions 127 and 128.

Figure 7:
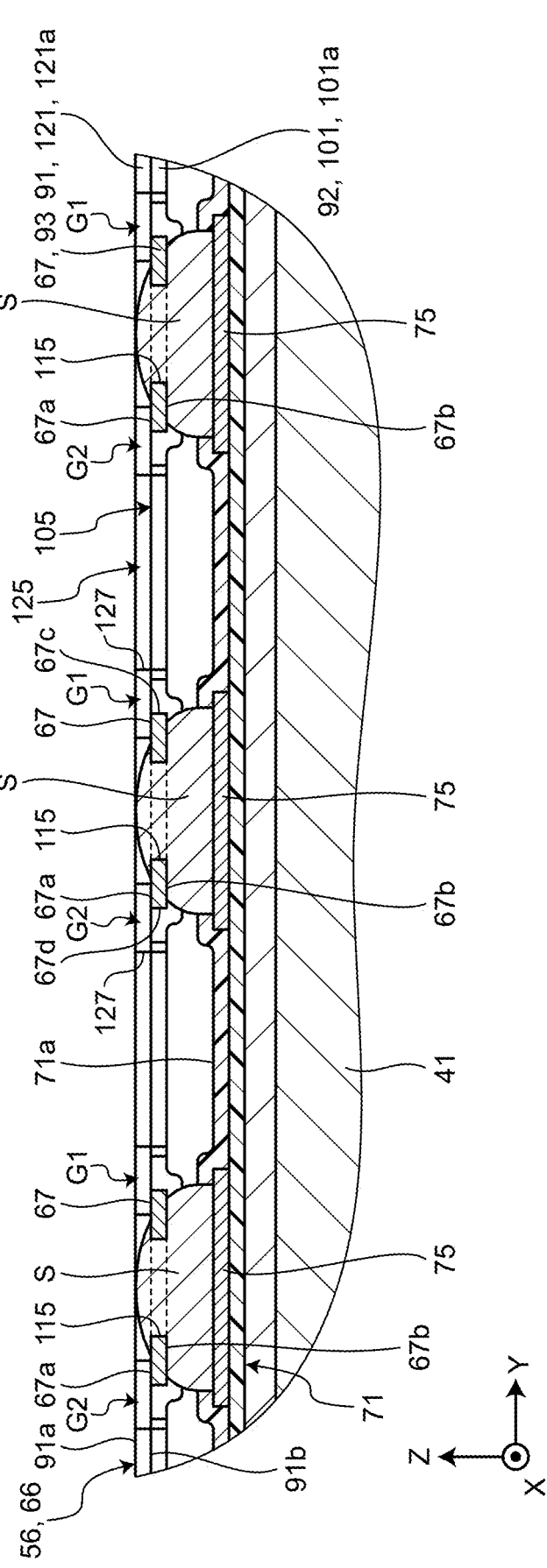
FIG. 7 is an exemplary cross-sectional view illustrating the tail connector and a joint of the first embodiment along F7-F7 line of FIG. 5.

FIG. 7 is an exemplary cross-sectional view illustrating the tail connector 66 and the joint 71 of the first embodiment along F7-F7 line of FIG. 5. As illustrated in FIG. 7, the solder S adheres to the pad 75 on the joint 71. Further, the solder S adheres to the surface 67*b* of the connection terminal 67, and also adheres to the surface 67*a* through the hole 115. Thus, the solder S joins the connection terminal 67 and the pad 75.

As illustrated in FIG. 5, a large number of wires 111 and 112 are provided in the tail connector 66. By thinning the conductive layer 93, the width of the wires 111 and 112 can also be reduced, and thus more wires 111 and 112 can be provided in the tail connector 66. For example, the thickness of the conductive layer 93 is set to 8 μm or less. The thickness of the conductive layer 93 is not limited to the present example.

As described above, the connection terminal 67 forms a flying lead. Therefore, by thinning the conductive layer 93, the connection terminal 67 is also thinned. The protrusions 127 and 128 of the base layer 91 of the present embodiment cover over half of the connection terminal 67 in the X direction. Therefore, the protrusions 127 and 128 can reinforce the thin connection terminal 67. Even when the lengths of the protrusion 127 and 128 are half or less of the length of the connection terminal 67, the protrusions 127 and 128 can reinforce the connection terminal 67.

In manufacturing the flexure 56, one sheet including a plurality of flexures 56 is formed. For example, the sheet is pulled between both ends wound in a roll shape. That is, the flexure 56 is pulled in a direction along the surfaces 91*a* and 91*b* of the base layer 91, for example.

When the flexure 56 is pulled, the thin connection terminal 67 is also pulled in the direction along the surfaces 91*a* and 91*b*. However, since the protrusions 127 and 128 reinforce the connection terminal 67, the connection terminal 67 is prevented from being damaged.

The protrusions 127 and 128 reduce the length in the X direction of the portion of the connection terminal 67 not covered with the base layer 91. Therefore, a portion of the connection terminal 67 that is not covered with the base layer 91 is less likely to be damaged even when being pulled in the X direction. In other words, the protrusions 127 and 128 can also improve strength of a portion of the connection terminal 67 that is not covered with the protrusions 127 and 128.

Figure 8:
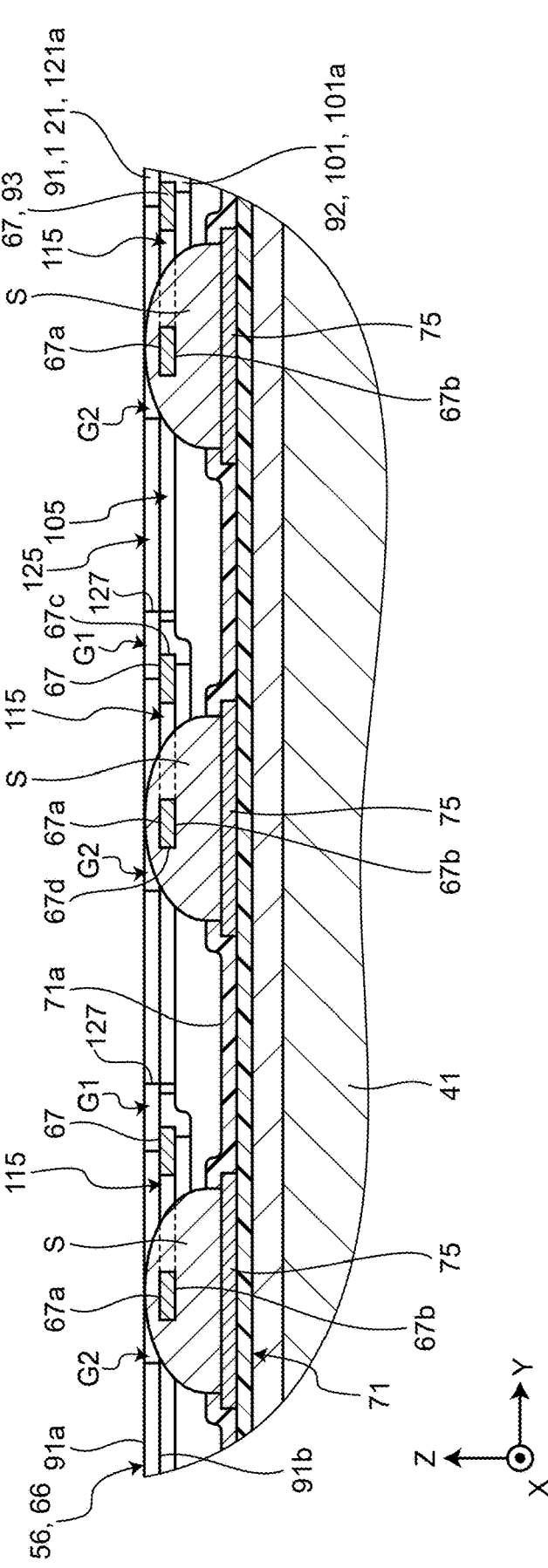
FIG. 8 is an exemplary cross-sectional view illustrating the tail connector and the joint of the first embodiment displaced from their predetermined positions.

FIG. 8 is an exemplary cross-sectional view illustrating the tail connector 66 and the joint 71 displaced from their predetermined positions of the first embodiment. In manufacturing the HGA 36, for example, a paste of the solder S is applied to the pad 75 by printing, and then the tail connector 66 is disposed on the row of the pad 75. By irradiating the plurality of tail connectors 66 with laser beam, the solder S is melted and wet-spreads on the connection terminal 67.

The tail connector 66 is relatively accurately positioned by, for example, a jig in the X direction. However, the tail connector 66 may be displaced from a predetermined position in the Y direction due to, for example, deflection of the rear part 62.

For example, as illustrated in FIG. 8, the tail connector 66 may be shifted in the +Y direction from the predetermined position. Here, the position of the connection terminal 67 and the corresponding positions of the pad 75 and the solder S are shifted in the Y direction. For example, the center of the surface 67*b* between the hole 115 and the edge 67*d* faces the center of the pad 75.

The gap G2 exposes the surface 67*b* and the edge 67*d* of the connection terminal 67 between the two protrusions 127 and 128. Therefore, the solder S adheres to the surface 67*b* through the hole 115 and adheres to the surface 67*b* around the edge 67*d*. Accordingly, a contact area between solder S and connection terminal 67 becomes sufficiently large. That is, the reliability of connection between the connection terminal 67 and the pad 75 is improved. In addition, the molten solder S can move the connection terminal 67 toward the predetermined position due to surface tension.

In contrast to the present embodiment, when the protrusions 127 and 128 are connected to each other and the protrusions 127 and 128 continuously cover the connection terminals 67 between the two lateral parts 121 and 122, the gaps G1 and G2 are not provided. Accordingly, the contact area between the solder S and the surface 67*b* of the connection terminal 67 becomes relatively small. In addition, the solder S is hardly wet-spread in the base layer 91 made of PI. In other words, the base layer 91 repels the solder S. Therefore, the molten solder S may flow on the protrusions 127 and 128 to be close to another connection terminal 67 to reduce a margin. However, in the present embodiment, by separating the protrusions 127 and 128 from each other, it is possible to sufficiently attach the solder S to the connection terminal 67 and prevent the solder S from approaching another connection terminal 67.

In the HDD 10 according to the first embodiment described above, the flexure 56 includes the gimbal 65 disposed on the support plate 55 and the tail connector 66 spaced from the support plate 55. The magnetic head 52 is mounted on the gimbal 65. The tail connector 66 includes the insulating base layer 91, the insulating cover layer 92, the conductive layer 93, and the backing layer 94. The conductive layer 93 is interposed between the base layer 91 and the cover layer 92. The backing layer 94 is attached to the base layer 91. The cover layer 92 includes the lateral part 101 and the lateral part 102 spaced from the lateral part 101. The cover groove 105 extends between the lateral part 101 and the lateral part 102. The conductive layer 93 includes at least one wire 111, at least one wire 112, and at least one connection terminal 67. The wire 111 is disposed on the lateral part 101 and is electrically connected to the magnetic head 52. The wire 112 is disposed on the lateral part 102. The connection terminal 67 extends between the wire 111 and the wire 112 across the cover groove 105. The base layer 91 includes the lateral part 121, the lateral part 122, at least one pair of protrusions 127, and at least one pair of protrusions 128. The lateral part 121 covers the wire 111. The lateral part 122 covers the wire 112. The pair of protrusions 127 are spaced from the lateral part 122, and protrude from the lateral part 121 to partially cover the connection terminal 67. The pair of protrusions 128 are spaced from the lateral part 121 and the pair of the protrusions 127, and protrude from the lateral part 122 to partially cover the connection terminal 67.

Without being covered by the base layer 91, the connection terminal 67 as a thin metal foil extending across the cover groove 105 may be fragile and susceptible to damage such as breakage or cracking, for example, during manufacturing. When the connection terminal 67 is continuously covered by the lateral part 121 and the lateral part 122 of the base layer 91, on the other hand, one surface 67*b* of the connection terminal 67 is, for example, in contact with the solder S for bonding the connection terminal 67 but the other surface 67*a* of the connection terminal 67 is in almost no contact with the solder S since it is covered by the base layer 91. This may decrease the contact area between the solder S and the connection terminal 67. In addition, the solder S is wetting less on the base layer 91. In other words, the contact angle between the solder S and the base layer 91 is larger. Because of this, displacement of the solder S and the connection terminal 67 from their predetermined positions, if it occurs, may cause the solder S to flow along the continuous surfaces 91*a* and 91*b* of the base layer 91 closer to another connection terminal 67. However, the base layer 91 of the present embodiment is provided with the pair of protrusions 127 and the pair of protrusions 128 disposed with spacing to partially cover the connection terminal 67. Namely, the connection terminal 67 can be reinforced by the protrusions 127 and the protrusions 128 and become unsusceptible to damage. As such, the manufacture of the HGA 36 of the present embodiment can be facilitated. Further, the solder S can be attached to the surface 67*a* of the connection terminal 67 exposed between the protrusions 127 and the protrusions 128. Thus, even if the solder S and the connection terminal 67 are displaced from their predetermined positions, the solder S can sufficiently adhere to the surface 67*a* of the connection terminal 67 exposed between the protrusion 127 and the protrusion 128. The solder S can be thus prevented from flowing closer to another connection terminal 67. Owing to such features, the HGA 36 can improve connection reliability of the connection terminal 67.

The conductive layer 93 is provided with the hole 115 penetrating the connection terminal 67. The hole 115 allows, for example, the solder S for bonding the connection terminal 67 to be exposed. The exposed solder S can be, for example, irradiated with laser beams through the hole 115 and thereby efficiently melted. Further, the solder S can adhere to one surface 67*b* of the connection terminal 67 and spread to the other surface 67*a* through the hole 115. In this manner, the solder S can sufficiently adhere to the connection terminal 67.

The connection terminal 67 extends in the +X direction from the wire 111 toward the wire 112. The pair of protrusions 127 are spaced from each other in the +Y direction orthogonal to the +X direction. The pair of protrusions 128 are spaced from each other in the +Y direction. In the +Y direction, the hole 115 is located in-between the pair of protrusions 127 and in-between the pair of protrusions 128.

Disposing the pair of protrusions 127 and the pair of protrusions 128 between the hole 115 and one edge 67*c* of the connection terminal 67 results in non-uniform exposure of the connection terminal 67. This may cause the solder S and the connection terminal 67 to be displaced from their predetermined positions, and as a result, the solder S may adhere to the region of the connection terminal 67 covered by the protrusion 127 and the protrusion 128. In this case, the contact area between the solder S and the connection terminal 67 decreases. However, in the present embodiment, the hole 115 is located in-between the pair of protrusions 127 and in-between the pair of protrusions 128. Namely, the protrusions 127 and the protrusions 128 are disposed in the vicinity of the hole 115 in a more balanced manner. In this manner, the solder S can be stably attached to the connection terminal 67 regardless of the direction of displacement of the connection terminal 67 with respect to the solder S.

One of the pair of protrusions 127 and one of the pair of protrusions 128 are spaced with the gap G1. The other of the pair of protrusions 127 and the other of the pair of protrusions 128 are spaced with the gap G2. In the +X direction, the hole 115 has a larger dimension than at least one of the gap G1 and the gap G2.

Due to the hole 115, the connection terminal 67 is divided into two beam-shaped parts in the vicinity of the hole 115. This may decrease the strength of the connection terminal 67 in the vicinity of the hole 115. However, the protrusion 127 and the protrusion 128 are formed to have a larger dimension to decrease the gap G1 and the gap G2. Because of this, the protrusion 127 and the protrusion 128 can more strongly reinforce the connection terminal 67.

The hole 115 is located in the center of the connection terminal 67. For example, when the hole 115 is not in the center of the connection terminal 67, the solder S and the connection terminal 67 may be displaced from their predetermined positions, causing the solder S to adhere to another position of the connection terminal 67 away from the hole 115. In this case, the solder S may not pass through the hole 115, resulting in a decrease in the contact area between the solder S and the connection terminal 67. However, in the present embodiment, the hole 115 is located in the center of the connection terminal 67. As a result, the solder S can easily flow through the hole 115 to be able to stably attach to the connection terminal 67 regardless of the direction of displacement of the connection terminal 67 with respect to the solder S.

The connection terminal 67 includes a pair of edges 67*c* and 67*d* opposing each other. The pair of protrusions 127 cover the pair of edges 67*c* and 67*d*. The pair of protrusions 128 cover the pair of edges 67*c* and 67*d*. That is, the protrusion 127 and the protrusion 128 can expand across the edges 67*c* and 67*d*. Thereby, the protrusion 127 and the protrusion 128 can be enlarged in size to be able to more strongly reinforce the connection terminal 67.

The gap G1 and the gap G2 are aligned with each other in the +Y direction. For example, misalignment of the gap G1 and the gap G2 in the +X direction may cause the solder S to adhere to another location of the connection terminal 67 away from the gaps G1 and G2. In this case, the contact area between the solder S and the connection terminal 67 decreases. However, in the present embodiment, the gap G1 and the gap G2 are at substantially the same position in the +X direction. Such a configuration allows the solder S to stably attach to the connection terminal 67 regardless of the direction of displacement of the connection terminal 67 with respect to the solder S.

The gap G1 and the gap G2 are in the center of the connection terminal 67 in the +X direction. When the gap G1 and the gap G2 are not in the center of the connection terminal 67 in the +X direction, the solder S and the connection terminal 67 may be displaced from their predetermined positions, and as a result, the solder S may adhere to the region covered by the protrusion 127 or the protrusion 128. In such a case, the contact area between the solder S and the connection terminal 67 decreases. However, in the present embodiment, the gap G1 and the gap G2 are in the center of the connection terminal 67 in the +X direction. That is, the protrusion 127 and the protrusion 128 are disposed in a more balanced manner around the center of the connection terminal 67. Such a configuration allows the solder S to stably attach to the connection terminal 67 regardless of the direction of displacement of the connection terminal 67 with respect to the solder S.

In the +X direction, the pair of protrusions 127 and the pair of protrusions 128 each have a length equal to 25% or more of the length of the connection terminal 67. In other words, one pair of the protrusion 127 and the protrusion 128 cover 50% or more of the connection terminal 67 in the +X direction. As such, the protrusions 127 and the protrusions 128 can more strongly reinforce the connection terminal 67.

The pair of protrusions 127 at least partially taper toward the lateral part 122. The pair of protrusions 128 at least partially taper toward the lateral part 121. As a result, the protrusions 127 and the protrusions 128 can avoid the hole 115 in the connection terminal 67, for example. In other words, in the vicinity of the hole 115, the protrusions 127 and the protrusions 128 allow a larger region of the connection terminal 67 to be exposed. Thus, the solder S can stably adhere to the connection terminal 67.

The cover layer 92 includes at least one pair of protrusions 107 and at least one pair of protrusions 108. The pair of protrusions 107 protrude from the lateral part 101 less than the pair of protrusions 127, to partially cover the connection terminal 67. The pair of protrusions 108 are spaced from the pair of protrusions 107, and protrude from the lateral part 102 less than the pair of protrusions 128 to partially cover the connection terminal 67. In this manner the protrusions 107 and the protrusions 108 can reinforce the connection terminal 67. The solder S typically attaches to the surface 67*b* of the connection terminal 67 covered with the cover layer 92. The protrusions 107 and the protrusions 108 have a shorter length, therefore, they are less likely to hinder the adhesion between the connection terminal 67 and the solder S. In other words, the solder S can be stably attached to the connection terminal 67.

The conductive layer 93 includes a plurality of wires 111, a plurality of wires 112, and a plurality of connection terminals 67. The plurality of connection terminals 67 extend in the +X direction from the plurality of wires 111 toward the plurality of wires 112. The base layer 91 includes a plurality of pairs of protrusions 127 and a plurality of pairs of protrusions 128. The plurality of connection terminals 67 are arranged at intervals in the +Y direction.

When the solder S and the connection terminal 67 are displaced from their predetermined positions, the solder S attached to one connection terminal 67 may flow toward an adjacent connection terminal 67. However, in the HGA 36 of the present embodiment, the solder S can be stably adhered to the connection terminal 67, therefore, it is unlikely that the solder S flows closer to the adjacent connection terminal 67.

Second Embodiment

Hereinafter, a second embodiment will be described with reference to FIG. 9. In the following description of the embodiment, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 9:
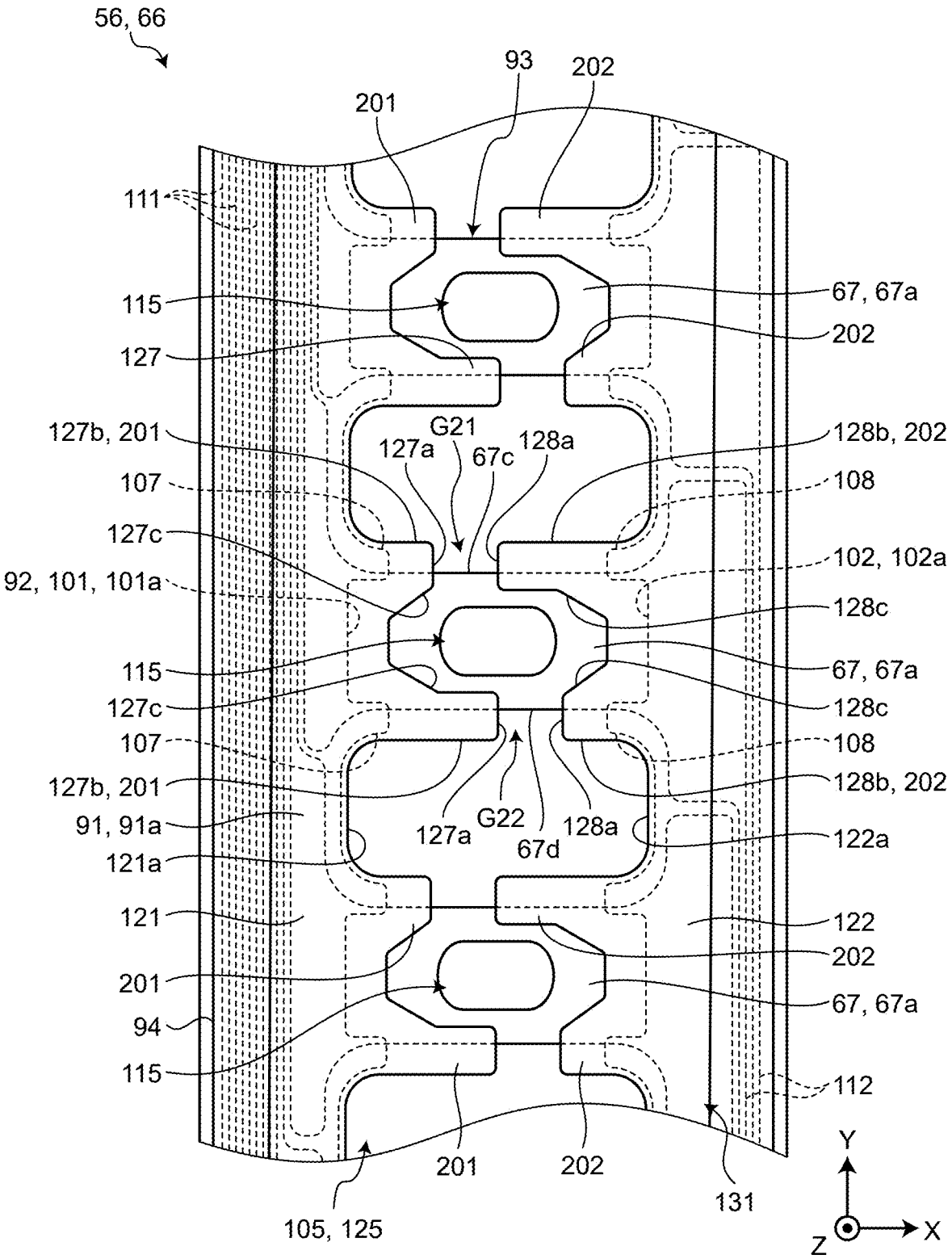
FIG. 9 is an exemplary plan view illustrating a part of a tail connector according to a second embodiment.

FIG. 9 is an exemplary plan view illustrating a part of the tail connector 66 according to the second embodiment. As illustrated in FIG. 9, the base layer 91 of the second embodiment includes a plurality of pairs of protrusions 201 and a plurality of pairs of protrusions 202 instead of the plurality of pairs of protrusions 127 and the plurality of pairs of protrusions 128. Except for the following aspects, the protrusion 201 is substantially equal to the protrusion 127 and the protrusion 202 is substantially equal to the protrusion 128.

One of the pair of protrusions 201 protrudes from the edge 121a of the lateral part 121 further than the other. One of the pair of protrusions 202 protrudes from the edge 122a of the lateral part 122 further than the other. Thus, the pair of protrusions 201 differ in length and the pair of protrusions 202 also differ in length.

The tip 127a of the shorter-length protrusion 201 and the tip 128a of the longer-length protrusion 202 face each other with a gap G21 therebetween. That is, the gap G21 lies between the shorter-length protrusion 201 and the longer-length protrusion 202. The gap G21 is an example of a first gap.

In the X direction, the longer-length protrusion 202 has a length equal to 25% or more of the of the connection terminal 67. Furthermore, in the X direction, the sum of the lengths of the shorter-length protrusion 201 and the longer-length protrusion 202 is 50% or more of the length of the connection terminal 67. The lengths of the protrusions 201 and 202 are not limited to the present example.

The tip 127a of the longer-length protrusion 201 and the tip 128a of the shorter-length protrusion 202 face each other with a gap G22 therebetween. That is, the gap G22 lies between the longer-length protrusion 201 and the shorter-length protrusion 202. The gap G22 is an example of a second gap.

In the X direction, the longer-length protrusion 201 has a length equal to 25% or more of the length of the connection terminal 67. Furthermore, in the X direction, the sum of the lengths of the longer-length protrusion 201 and the shorter-length protrusion 202 is 50% or more of the length of the connection terminal 67. The lengths of the protrusions 201 and 202 are not limited to the present example.

In the X direction (+X direction), the gap G21 is at a different position from the gap G22. Thus, the gaps G21 and G22 are not in alignment in the Y direction (+Y direction) but are alternated.

In the HDD 10 of the second embodiment described above, the gap G21 differs in position from the gap G22 in the +X direction. That is, the pair of protrusions 201 have mutually different shapes from each other. The pair of protrusions 202 also have mutually different shapes. Because of this, stress dispersion easily occurs in the connection terminal 67 reinforced by the protrusions 201 and the protrusions 202. The longer one of the pair of protrusions 201 and the longer one of the pair of protrusions 202 are aligned with each other in the center of the connection terminal 67 in the +X direction. Namely, in the +X direction the center of the connection terminal 67 is reinforced by both the protrusions 201 and the protrusions 202. In addition, of the connection terminal 67, the portions with the gap G21 and the gap G22 may be fragile but are not side by side. As such, the protrusions 201 and the protrusions 202 can reinforce the connection terminal 67 more strongly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A suspension assembly comprising:
   a support plate;
   a wiring member including a mount disposed on the support plate, and a tail connector spaced from the support plate; and
   a magnetic head mounted on the mount, wherein
   the tail connector includes
       a base layer having insulating properties,
       a cover layer having insulating properties,
       a conductive layer interposed between the base layer and the cover layer, and
       a backing layer attached to the base layer,
   the cover layer includes a first cover and a second cover spaced from the first cover, and a groove extending between the first cover and the second cover,
   the conductive layer includes
       a plurality of first wires disposed on the first cover and electrically connected to the magnetic head,
       a plurality of second wires disposed on the second cover, and
       a plurality of connection terminals each extending between one of the first wires and one of the second wires across the groove, the base layer includes
       a first base that covers the plurality of first wires, a second base that covers the plurality of second wires, a plurality of pairs of first protrusions each spaced from the second base and protruding from the first base, and a plurality of pairs of second protrusions each spaced from the first base and the plurality of pairs of first protrusions and protruding from the second base, and each of the plurality of connection terminals is partially covered by one pair of the plurality of pairs of first protrusions and one pair of the plurality of pairs of second protrusions.

2. The suspension assembly according to claim 1, wherein each of the plurality of connection terminals is provided with a hole penetrating the connection terminal.

3. The suspension assembly according to claim 2, wherein each of the plurality of connection terminals extends in a first direction from one of the plurality of first wires toward one of the plurality of second wires, each pair of the plurality of pairs of first protrusions is spaced from the other pairs of the plurality of pairs of first protrusions in a second direction orthogonal to the first direction, each pair of the plurality of pairs of second protrusions is spaced from the other pairs of the plurality of pairs of second protrusions in the second direction, and in the second direction, the hole is located in-between one pair of the plurality of pairs of first protrusions and in-between one pair of the plurality of pairs of second protrusions.

4. The suspension assembly according to claim 2, wherein each of the plurality of connection terminals extends in a first direction from one of the plurality of first wires toward one of the plurality of second wires, one pair of the plurality of pairs of first protrusions and one pair of the plurality of pairs of second protrusions are spaced with a first gap, another pair of the plurality of pairs of first protrusions and another pair of the plurality of pairs of second protrusions are spaced with a second gap, and in the first direction, the hole is larger in dimension than at least one of the first gap and the second gap.

5. The suspension assembly according to claim 2, wherein the hole is located in a center of one of the plurality of connection terminals.

6. The suspension assembly according to claim 1, wherein each of the plurality of connection terminals includes a pair of edges opposing each other, each pair of the plurality of pairs of first protrusions cover the pair of edges, and each pair of the plurality of pairs of second protrusions cover the pair of edges.

7. The suspension assembly according to claim 6, wherein each of the plurality of connection terminals extends in a first direction from one of the first wires toward one of the second wires, each pair of the plurality of pairs of first protrusions is spaced from the other pairs of the plurality of pairs of first protrusions in a second direction orthogonal to the first direction, each pair of the plurality of pairs of second protrusions is spaced from the other pairs of the plurality of pairs of second protrusions in the second direction, one pair of the plurality of pairs of first protrusions and one pair of the plurality of pairs of second protrusions are spaced with a first gap, another pair of the plurality of pairs of first protrusions and another pair of the second protrusions are spaced with a second gap, and the first gap and the second gap are aligned in the second direction.

8. The suspension assembly according to claim 7, wherein the first gap and the second gap are located in a center of one of the plurality of connection in the first direction.

9. The suspension assembly according to claim 7, wherein in the first direction, the plurality of pairs of first protrusions and the plurality of pairs of second protrusions each have a length equal to 25% or more of a length of one of the plurality of connection terminals.

10. The suspension assembly according to claim 6, wherein each of the plurality of connection terminals extends in a first direction from one of the plurality of first wires toward one of the plurality of second wires, one pair of the plurality of pairs of first protrusions and one pair of the plurality of pairs of second protrusions are spaced with a first gap, another pair of the plurality of pairs of first protrusions and another pair of the plurality of pairs of second protrusions are spaced with a second gap, and in the first direction, the first gap differs in position from the second gap.

11. The suspension assembly according to claim 1, wherein each of the plurality of pairs of first protrusions at least partially taper toward the second base, and each of the plurality of pairs of second protrusions at least partially taper toward the first base.

12. The suspension assembly according to claim 1, wherein the cover layer includes a plurality of pairs of third protrusions each protruding from the first cover less than each pair of the plurality of pairs of first protrusions, and a plurality of pairs of fourth protrusions spaced from the plurality of pairs of third protrusions and each protruding from the second cover less than each pair of the plurality pairs of second protrusions, to partially cover the connection terminal and each of the plurality of connection terminals is partially covered by one pair of the plurality of pairs of third protrusions and one pair of the plurality of pairs of fourth protrusions.

13. The suspension assembly according to claim 1, wherein each of the plurality of connection terminals extends in a first direction, and the plurality of connection terminals are disposed at intervals in a second direction orthogonal to the first direction.

14. A disk device comprising:

the suspension assembly according to claim 1;

a magnetic disk;

a substrate provided with a plurality of pads; and a plurality of solders that each joins one of the plurality of connection terminals and one of the plurality of pads.

* * * * *